United States Patent
Leong et al.

(10) Patent No.: US 7,889,748 B1
(45) Date of Patent: Feb. 15, 2011

(54) MAPPING A PORT ON A PACKET SWITCH APPLIANCE

(75) Inventors: Patrick Pak Tak Leong, Palo Alto, CA (US); King L. Won, San Jose, CA (US); Ted Ho, San Jose, CA (US)

(73) Assignee: Gigamon LLC., Milpitas, CA (US)

( * ) Notice: Subject to any disclaimer, the term of this patent is extended or adjusted under 35 U.S.C. 154(b) by 843 days.

(21) Appl. No.: 11/701,731

(22) Filed: Feb. 2, 2007

(51) Int. Cl.
H04L 12/28 (2006.01)

(52) U.S. Cl. .................. 370/401; 370/249; 370/392

(58) Field of Classification Search .......... 370/230, 370/235, 241, 249, 392, 401
See application file for complete search history.

(56) References Cited

U.S. PATENT DOCUMENTS

| | | | | |
|---|---|---|---|---|
| 5,946,308 A * | 8/1999 | Dobbins et al. | ............. | 370/392 |
| 6,208,649 B1 * | 3/2001 | Kloth | ............. | 370/392 |
| 6,298,061 B1 * | 10/2001 | Chin et al. | ............. | 370/400 |
| 6,385,197 B1 * | 5/2002 | Sugihara | ............. | 370/380 |
| 6,898,086 B2 * | 5/2005 | Takami et al. | ............. | 361/792 |
| 7,111,101 B1 * | 9/2006 | Bourke et al. | ............. | 710/305 |
| 7,145,866 B1 * | 12/2006 | Ting et al. | ............. | 370/225 |
| 7,170,892 B2 * | 1/2007 | Major et al. | ............. | 370/392 |
| 7,688,825 B2 * | 3/2010 | Shimizu | ............. | 370/392 |
| 2001/0055274 A1 * | 12/2001 | Hegge et al. | ............. | 370/229 |
| 2002/0075809 A1 * | 6/2002 | Phaal | ............. | 370/245 |
| 2002/0176426 A1 * | 11/2002 | Asano et al. | ............. | 370/401 |
| 2005/0083835 A1 * | 4/2005 | Prairie et al. | ............. | 370/224 |
| 2005/0254490 A1 | 11/2005 | Gallatin et al. | | |
| 2005/0265248 A1 | 12/2005 | Gallatin et al. | | |
| 2005/0265364 A1 * | 12/2005 | Gallatin et al. | ............. | 370/401 |
| 2005/0271065 A1 | 12/2005 | Gallatin et al. | | |
| 2008/0056122 A1 * | 3/2008 | Madhi et al. | ............. | 370/216 |

\* cited by examiner

*Primary Examiner*—Ricky Ngo
*Assistant Examiner*—DeWanda Samuel
(74) *Attorney, Agent, or Firm*—Vista IP Law Group, LLP.

(57) ABSTRACT

A packet switch appliance includes a plurality of ports. One of the plurality of ports is configured to operate as a network port connected to a packet-switching network. To map the network port of the packet switch appliance, a port map is created. The port map includes a first map rule, which has a first criterion and a first action, and at least a second map rule, which has a second criterion and a second action. The port map is assigned to the network port. When an ingress packet is received from the packet-switching network through the network port, the port map is applied to the ingress packet.

64 Claims, 5 Drawing Sheets

MAPPING A PORT ON A PACKET SWITCH APPLIANCE

BACKGROUND

1. Field

The present application generally relates to packet switch appliances, and, more particularly, to mapping a port on a packet switch appliance.

2. Related Art

In a packet-switching network, the transmission, routing, forwarding, and the like of messages between the terminals in the packet-switching network are broken into one or more packets. Associated with each terminal in the packet-switching network is a unique terminal address. Each of the packets of a message has a source terminal address, a destination terminal address, and a payload, which contains at least a portion of the message. The source terminal address is the terminal address of the source terminal of the packet. The destination terminal address is the terminal address of the destination terminal of the packet. Further, each of the packets of a message may take different paths to the destination terminal, depending on the availability of communication channels, and may arrive at different times. The complete message is reassembled from the packets of the message at the destination terminal. One skilled in the art commonly refers to the source terminal address and the destination terminal address as the source address and the destination address, respectively.

Packet switch appliances can be used to forward packets in the packet-switching network. Packet switch appliances have one or more network ports connected to the packet-switching network. The network port of a packet switch appliance can include a filter, which either drops or forwards packets. A conventional filter typically has only a single condition, which is used to determine whether a packet is to be dropped or forwarded.

SUMMARY

In one exemplary embodiment, a packet switch appliance includes a plurality of ports. One of the plurality of ports is configured to operate as a network port connected to a packet-switching network. To map the network port of the packet switch appliance, a port map is created. The port map includes a first map rule, which has a first criterion and a first action, and at least a second map rule, which has a second criterion and a second action. The port map is assigned to the network port. When an ingress packet is received from the packet-switching network through the network port, the port map is applied to the ingress packet.

DESCRIPTION OF DRAWING FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
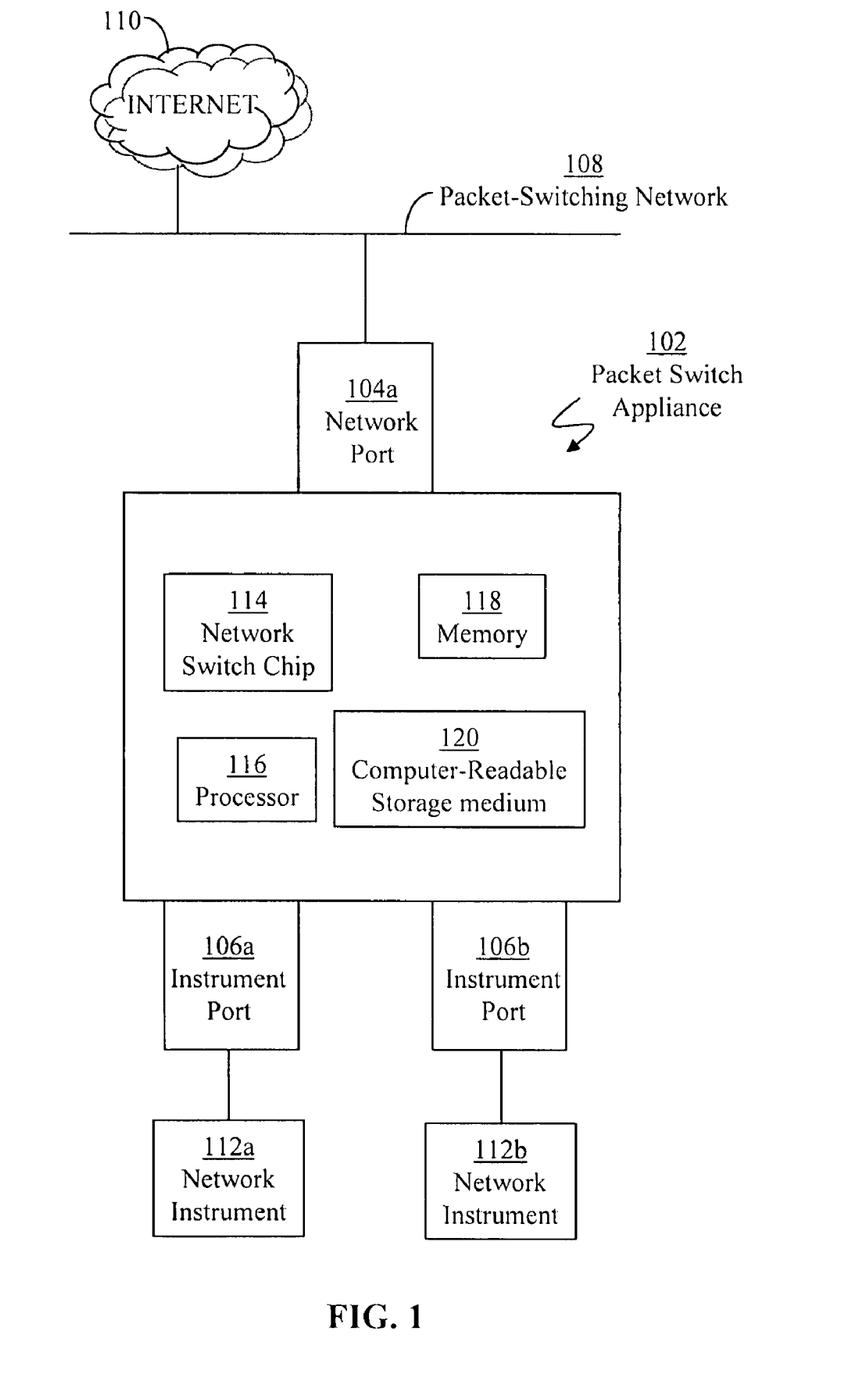
FIG. 1 depicts an exemplary packet switch appliance.

With reference to FIG. 1, an exemplary packet switch appliance 102 is depicted. Packet switch appliance 102 includes a plurality of ports. In FIG. 1, packet switch appliance 102 is depicted with one port configured as a network port 104a, which is connected to packet-switching network 108. Two additional ports on packet switch appliance 102 are depicted as being configured as instrument port 106a, which is connected to network instrument 112a, and instrument port 106b, which is connected to network instrument 112b. Packet switch appliance 102 receives traffic through network port 104a and distributes the traffic to instrument ports 106a and 106b. In distributing the traffic, packet switch appliance 102 can perform various functions, such as one-to-one, one-to-many, many-to-one, and many-to-many port distributing; ingress and egress filtering; flow-based streaming; and load balancing. For a more detailed description of these features, see U.S. patent application Ser. Nos. 11/123,273; 11/123,377; 11/123,465; and 11/123,729, which were filed on May 5, 2005, and which are incorporated herein by reference in their entireties.

FIG. 1 depicts packet-switching network 108 being connected to the Internet 110. It should be recognized, however, that packet-switching network 108 can be a private network having various types of network devices. FIG. 1 also depicts two network instruments 112a and 112b connected to instrument ports 106a and 106b, respectively. It should be recognized that the two network instruments 112a and 112b can be the same type of device or different types of devices, such as sniffers, intrusion detection systems (IDS), intrusion prevention systems (IPS), forensic recorders, and the like.

In one exemplary embodiment, at least one network port 104a of packet switch appliance 102 is mapped. In particular, with reference to FIG. 2, an exemplary mapping process 200 is depicted. For the sake of clarity, the following description describes one network port being mapped using mapping process 200. It should be recognized, however, that any number of network ports can be mapped using mapping process 200.

Figure 2:
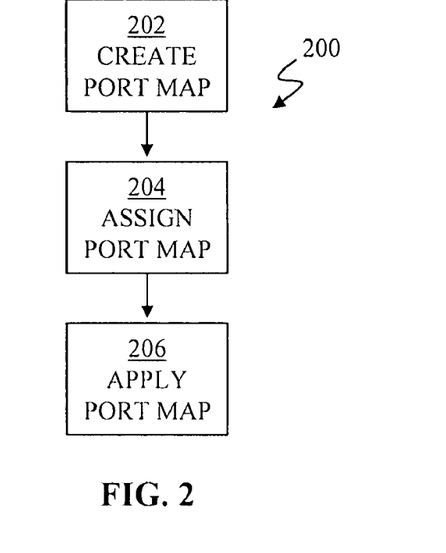
FIG. 2 depicts an exemplary mapping process for a network port on the exemplary packet switch appliance depicted in FIG. 1.

In step 202, a port map is created. In the present exemplary embodiment, the port map includes a series of two or more map rules. Each map rule has a criterion and an action, which is performed when the criterion of the map rule is met. For example, an exemplary port map can include a first map rule and a second map rule. The first map rule can include a first criterion and a first action. The second map rule can include a second criterion and a second action.

In one exemplary implementation, a port map can be created by creating a port map object and creating the map rules for the port map object. For example, the port map object can be created using the command, "config map alias <string>". A map rule can be created using the command, "config map-rule <map-alias/map-id> rule [criterion] tool [action]". It should be recognized, however, that various commands can be used to create the port map object and the map rules.

A criterion of a map rule can specify a value of any portion or portions of a packet. For example, a criterion of a map rule can specify a bit value or byte values at certain offsets from the beginning of a packet, a virtual local area network (VLAN) identification of the packet, source address, destination address, and the like. When a packet matches the criterion of a map rule, the action of the map rule can be to drop the matching packet. Alternatively, the action of the map rule can be to forward the matching packet to one or more specified instrument ports, including a list of instrument ports.

In the present exemplary embodiment, a port map can include a "garbage collection" rule, which includes a criterion and an action. The action of the "garbage collection" rule is performed when the criteria of all other map rules of the port map are not met. The action of the "garbage collection" rule can be to drop the packet. Alternatively, the action of the "garbage collection" rule can be to forward the packet to one or more specified instrument ports.

With reference again to FIG. 2, in step 204, the created port map can be assigned to a network port. With reference to FIG. 1, as described above, at least one of the ports of packet switch appliance 102 is configured as a network port 104a, which is connected to packet-switching network 108. The port map can be assigned to network port 104a. For example, a port map can be assigned using the command, "config mapping net <network port number or network port list> map <map-alias/map-id>". It should be recognized, however, that various commands can be used to assign the port map to a network port.

One port map can be assigned to any number of additional network ports. For example, if three ports of packet switch appliance 102 are configured as network ports, then one, two, or all three network ports can be assigned the same port map. Alternatively, each network port can be assigned different port maps.

In the present exemplary embodiment, a port map is only assigned to network ports and not to instrument ports. Thus, with reference to FIG. 1, the flow of packets in packet switch appliance 102 is from a network port 104a to one or more instrument ports 106a, 106b rather than from an instrument port 106a or 106b to a network port 104a.

With reference again to FIG. 2, in step 206, when an ingress packet is received from the packet-switching network through a network port that has been assigned a port map, the port map assigned to the network port is applied to the ingress packet. As described above, the criterion of a map rule can specify a value of any portion or portions of a packet, such as a bit value or byte values at certain offsets from the beginning of a packet, a virtual local area network (VLAN) identification of the packet, source address, destination address, and the like. Thus, when an ingress packet is received, the received ingress packet is examined. The criteria of the map rules are evaluated based on the examination of the ingress packet.

In one optional implementation, the map rules of the port map can be applied to the ingress packet in a predetermined order. For example, assume that a first map rule is ordered ahead of a second map rule. Thus, when an ingress packet is received, the first criterion of the first map rule is evaluated before the second criterion of the second map rule. If the first criterion is met, then the first action of the first map rule is performed. Also, if the first criterion is met, then the second criterion or any other criterion in the port map is not evaluated because the first map rule is ordered ahead of the second map rule and all other map rules in the port map. Hence none of the actions of the other map rules are performed because none of the other criteria of the other map rules in the port map are evaluated once the first criterion of the first map rule is met. If the first criterion is not met, then the second criterion is evaluated. If the second criterion is met, then the second action is performed. Assuming there are no other map rules in the port map, then the action of the "garbage collection" rule is performed.

Note, the "garbage collection" action is performed only if none of the criteria of the other map rules in the port map are met. In this example, assuming that the port map only has the first and second map rules, then the action of the "garbage collection" rule is performed if only both the first and second criteria are not met. In one example, the criterion of the "garbage collection" rule is a null, which means that the criterion of the "garbage collection" rule will always be met when it is evaluated. Thus, when the port map is applied, all the criteria of all map rules other than the "garbage collection" rule are evaluated before the null criterion of the "garbage collection" rule is evaluated to perform the action of the "garbage collection" rule.

In another optional implementation, all of the map rules of the port map can be applied to an ingress packet received through a network port. A rule resolution procedure can be applied if the criteria of multiple map rules of the port map are met. The rule resolution procedure can include, but not limited to, performing the action of the map rule with the criterion that was first met, performing the action of the map rule with the criterion that was last met, or performing the actions of all the map rules with criteria that were met. If none of the criteria of the map rules other than the "garbage collection" rule in the port map are met, then the action of the "garbage collection" rule can be performed.

As described above, when an ingress packet meets the criterion specified in a map rule, the action of a map rule can be to drop the ingress packet. Alternatively, the action can be to forward the ingress packet to one or more instrument ports. Thus, in this manner, ingress packets received through a network port can be distributed amongst any number of instrument ports based on the map rules of the port map assigned to the network port.

As a first example, with reference to FIG. 1, assume a port map has been assigned to network port 104a depicted in FIG. 1. Assume that the assigned port map includes a first map rule with a first criterion and a first action, which is to forward matching ingress packets to both instrument ports 106a and 106b depicted in FIG. 1. Thus, when an ingress packet is received through network port 104a that matches the first criterion, the matching ingress packet is forwarded to instrument ports 106a and 106b. In this manner, the matching ingress packet is forwarded to network instrument 112a, which is connected to instrument port 106a, and network instrument 112b, which is connected to instrument port 106b.

As a second example, assume now that the first action of the first map rule is to forward matching ingress packets only to instrument port 106a. Assume also that the second action of the second map rule is to forward matching ingress packets only to instrument port 106b. Thus, when an ingress packet is received, if the ingress packet matches the first criterion of the first map rule, then the matching ingress packet is forwarded to instrument port 106a. If the ingress packet matches the second criterion of the second map rule, then the matching ingress packet is forwarded to instrument port 106b. Thus, ingress packets received through network port 104a can be distributed between instrument ports 106a and 106b based on the map rules of the port map assigned to network port 104a.

Figure 3:
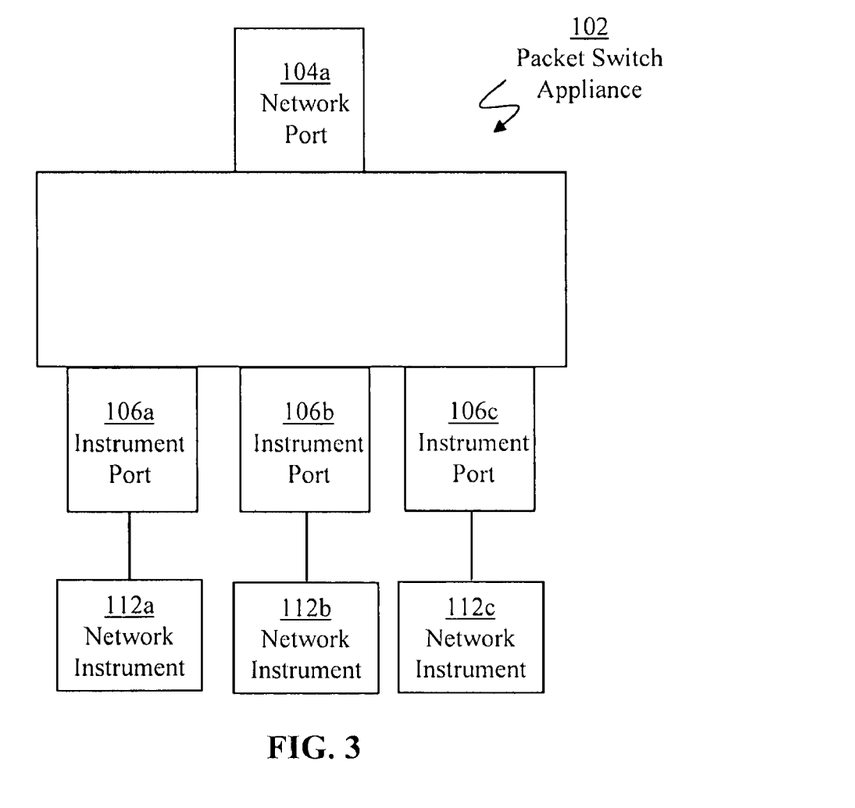
FIG. 3 depicts another exemplary packet switch appliance.

As a third example, with reference to FIG. 3, now assume that another port on packet switch appliance 102 is configured as another instrument port 106c, which is connected to another network instrument 112c. Assume that the first action of the first map rule is to forward matching ingress packets to instrument ports 106a and 106b. Assume also that the second action of the second map rule is to forward matching ingress packets to instrument port 106c. Thus, when an ingress packet is received, if the ingress packet matches the first criterion of the first map rule, then the matching ingress packet is forwarded to instrument ports 106a and 106b. If the ingress packet matches the second criterion of the second map rule, then the matching ingress packet is forwarded to instrument port 106c.

As a fourth example, now assume that the first action of the first map rule is to forward matching ingress packets to instrument port 106a. Assume also that the second action of the second map rule is to forward matching ingress packets to instrument ports 106b and 106c. Thus, when an ingress packet is received, if the ingress packet matches the first criterion of the first map rule, then the matching ingress packet is forwarded to instrument port 106a. If the ingress packet matches the second criterion of the second map rule, then the matching ingress packet is forwarded to instrument ports 106b and 106c.

Figure 4:
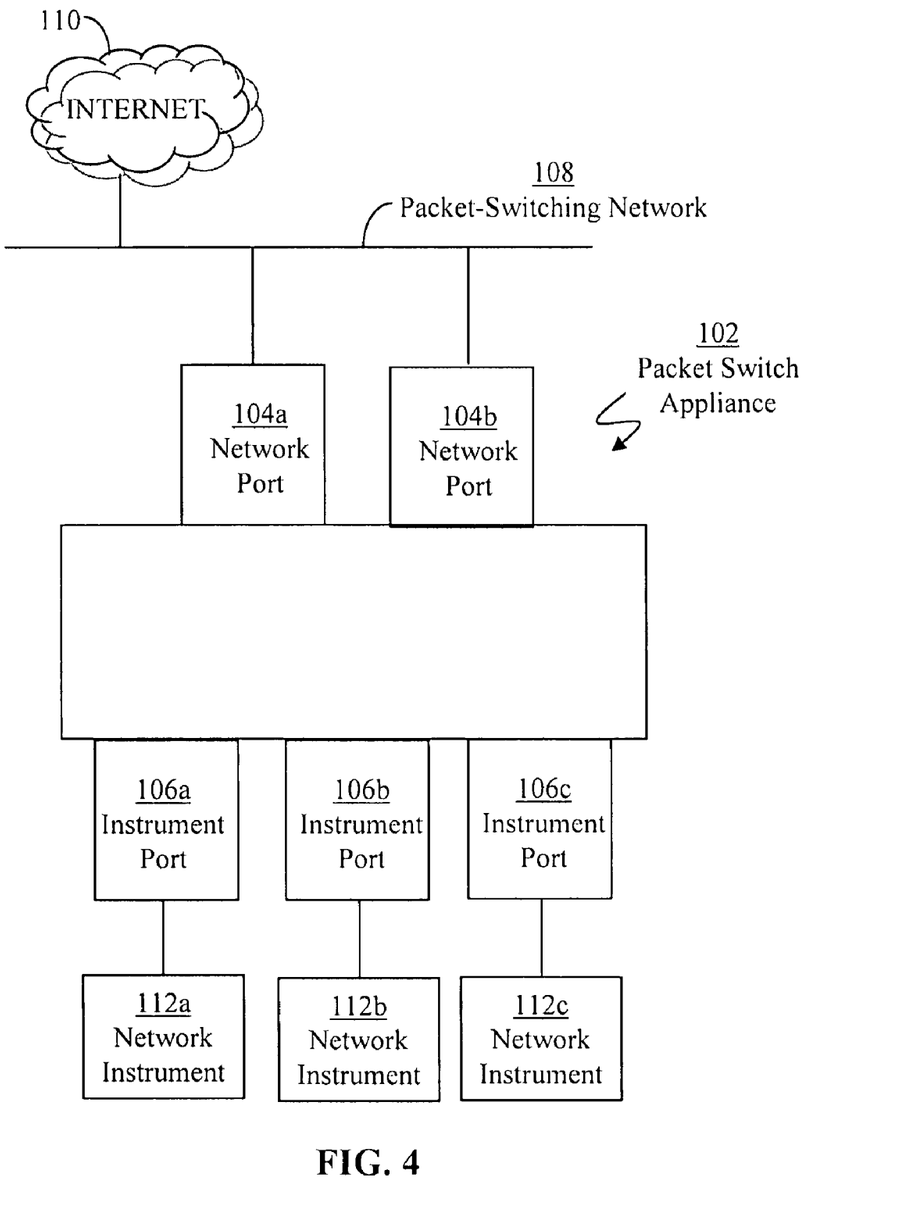
FIGS. 4-6 depict additional exemplary embodiments of a packet switch appliance.

As a fifth example, with reference to FIG. 4, now assume that another port on packet switch appliance 102 is configured as another network port 104b connected to packet-switching network 108. The same port map can be assigned to network port 104a and network port 104b. Thus, when an ingress packet is received through network port 104b, the same port map is applied as if the ingress packet was received through network port 104a. Alternatively, different port maps can be assigned to network port 104a and network port 104b. For example, a first port map can be assigned to network port 104a, and a second port map can be assigned to network port 104b. The first port map can include a first map rule, which has a first criterion and a first action, and a second map rule, which has a second criterion and a second action. The second port map can include a third map rule, which has a third criterion and a third action, and a fourth map rule, which has a fourth criterion and a fourth action. Thus, when an ingress packet is received through network port 104a, the first port map is applied to the ingress packet. When an ingress packet is received through network port 104b, the second port map is applied to the ingress packet.

As described above, dropping a packet is one action that can be performed when a criterion of a map rule is met. In one exemplary implementation, the action to drop a packet is implemented in a manner similar to the action to forward a packet to an instrument port. For example, a packet is forwarded to an instrument by the following map rule: "config map-rule <map-alias/map-id> rule [criterion] tool [instrument port]". A packet is dropped by the following map rule: "config map-rule <map-alias/map-id> rule [criterion] tool [drop]". Thus, dropping a packet can be viewed as forwarding the packet to a virtual drop port, which is not a physical port.

In one exemplary implementation, each map rule of a port map can be implemented using a filter. For example, with reference to FIG. 3, assume a first map rule of a port map assigned to network port 104a has a first criterion and a first action, which specifies that a packet matching the first criterion is forwarded to instrument port 106a. Assume a second map rule of the port map assigned to network port 104a has a second criterion and a second action, which specifies that a packet matching the second criterion is forwarded to instrument port 106b.

In the present exemplary implementation, a first filter is assigned to network port 104a with a criterion, which matches the first criterion of the first map rule, and an action, which matches the first action of the first map rule (i.e., to forward a matching packet to instrument port 106a). Thus, when a packet is received that matches the criterion of the first filter, the packet is forwarded to instrument port 106a. A second filter is assigned to network port 104a with a criterion, which matches the second criterion of the second map rule, and an action, which matches the second action of the second map rule (i.e., to forward a matching packet to instrument port 106b). Thus, when a packet is received that matches the criterion of the second filter, the packet is forwarded to instrument port 106b.

As described above, the action of one map rule can be to forward a packet to multiple instrument ports. A typical filter, however, can only forward a packet to a single port. Thus, in the present exemplary embodiment, a loop-back port is used in conjunction with a VLAN domain to implement a map rule that forwards a packet to multiple instrument ports.

Figure 5:
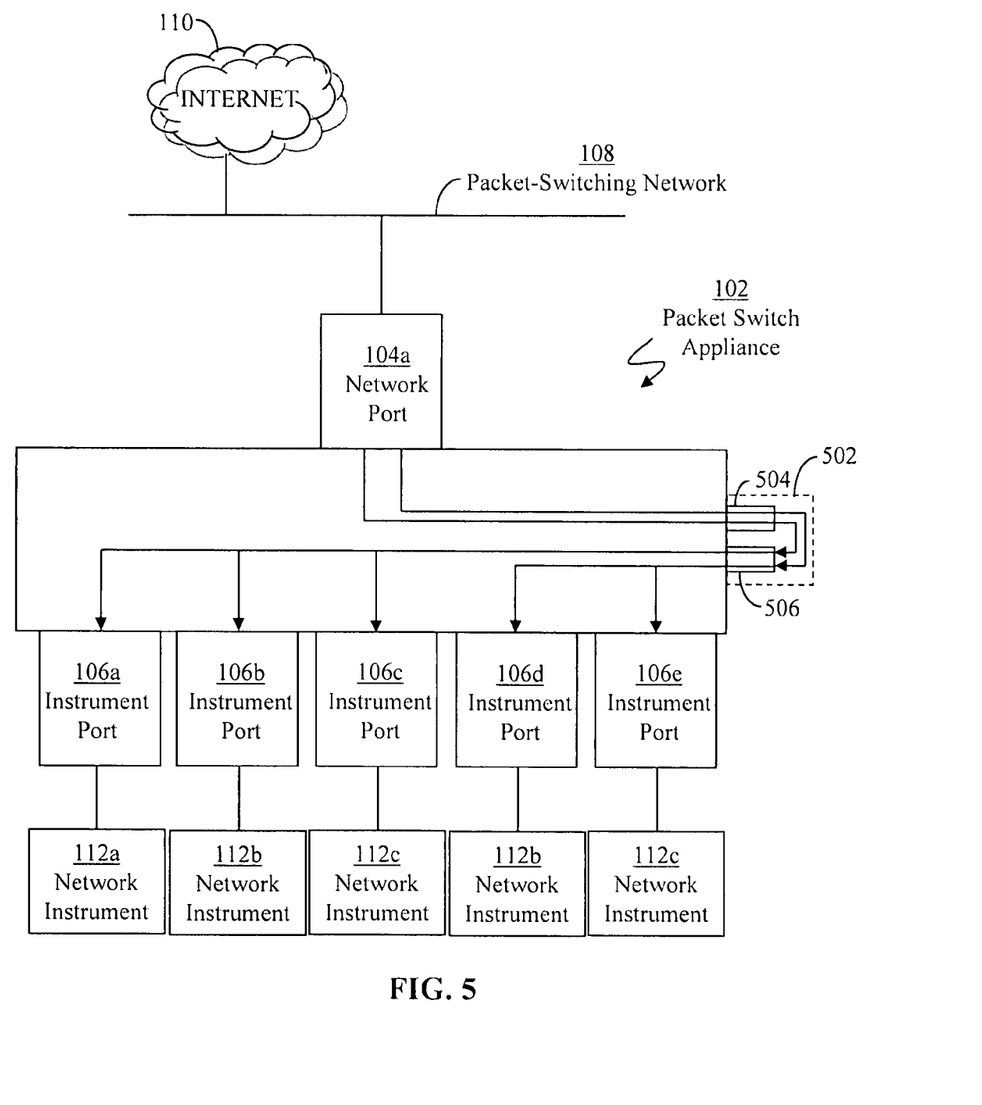

In particular, with reference to FIG. 5, packet switch appliance 102 is depicted with a loop-back port 502. As depicted in FIG. 5, loop-back port 502 includes an egress portion 504 and an ingress portion 506. Thus, when a packet is sent to loop-back port 502, the packet is sent out via egress portion 504 and looped back via ingress portion 506. In the present exemplary implementation, egress portion 504 is configured not to remove VLAN tags from packets, and ingress portion 506 is configured not to add VLAN tags to packets.

Loop-back port 502 can be implemented using a single port. For example, egress portion 504 and ingress portion 506 can be separate paths in a single full-duplex port. Alternatively, loop-back port 502 can be implemented using a pair of ports connected together. For example, egress portion 504 can correspond to a first port, and ingress portion 506 can correspond to a second port, which is separate from the first port but connected to the first port.

Assume a first map rule of a port map assigned to network port 104a has a first criterion and a second action, which specifies that a packet matching the first criterion is forwarded to instrument ports 106a, 106b, and 106c. Assume a second map rule of the port map assigned to network port 104a has a second criterion and a second action, which specifies that a packet matching the second criterion is forwarded to instrument ports 106d and 106e.

In the present exemplary implementation, a first VLAN is created having a membership that includes loop-back port 502 and instrument ports 106a, 106b, and 106c. A first filter is assigned to network port 104a with a criterion, which matches the first criterion of the first map rule, and an action, which specifies that the VLAN tag of a packet matching the criterion of the first filter be replaced with a first VLAN tag that corresponds to the first VLAN. The action of the first filter also specifies that the packet matching the criterion of the first filter be forwarded to loop-back port 502. The matching packet is sent out via port 504 without removing the first VLAN tag and looped-back via port 506 without adding any more VLAN tags. As depicted in FIG. 5, because instrument ports 106a, 106b, and 106c are members of the first VLAN, the matching packet is forwarded to instruments port 106a, 106b, and 106c when it is looped back via port 506 with the first VLAN tag.

A second VLAN is created having a membership that includes loop-back port 502 and instrument ports 106d and 106e. A second filter is assigned to network port 104a with a criterion, which matches the second criterion of the second map rule, and an action, which specifies that the VLAN tag of a packet matching the criterion of the second filter be replaced with a second VLAN tag that corresponds to the second VLAN. The action of the second filter also specifies that the packet matching the criterion of the second filter be forwarded to loop-back port 502. The matching packet is sent out via port 504 without removing the second VLAN tag and looped back via port 506 without adding any more VLAN tags. As depicted in FIG. 5, because instrument ports 106d and 106e are members of the second VLAN, the matching packet is forwarded to instruments port 106*d* and 106*e* when it is looped back via port 506 with the second VLAN tag.

Figure 6:
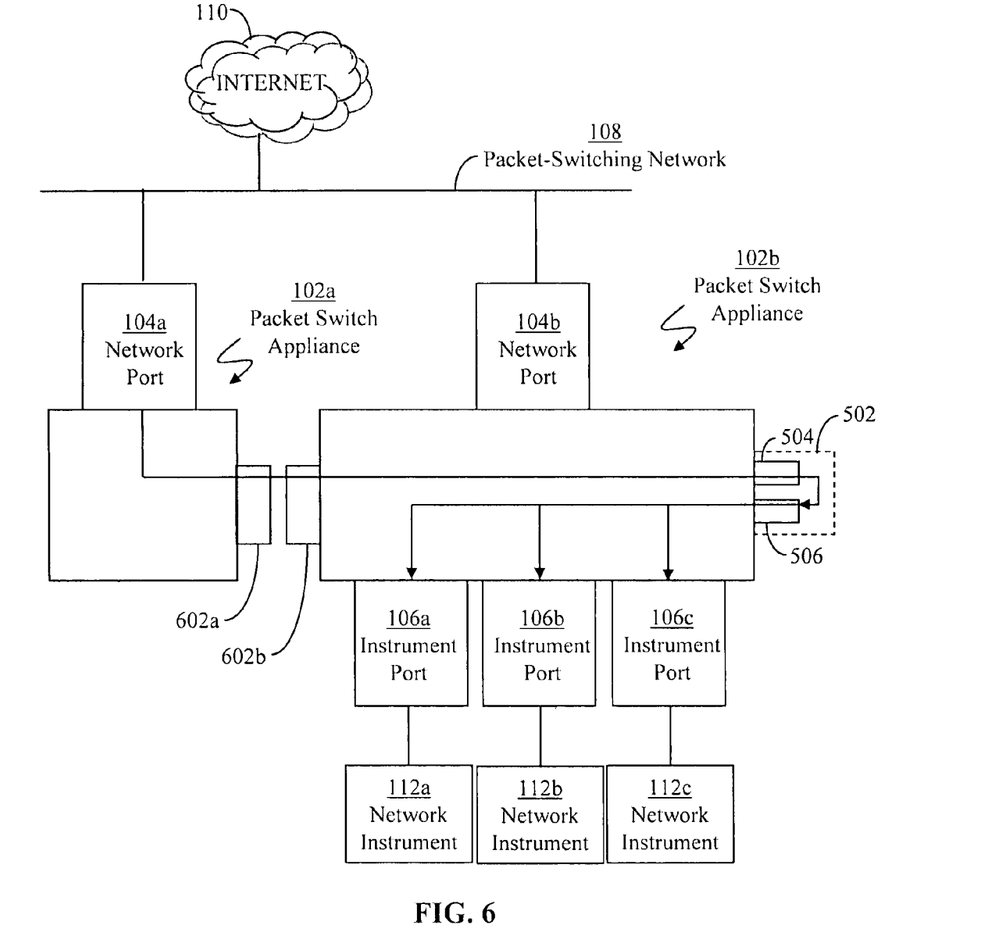

With reference to FIG. 6, multiple packet switch appliances can be stacked together using ports on the packet switch appliances configured to be transport ports. For example, packet switch appliances 102*a* and 102*b* can be stacked together using port 602*a* and 602*b*, which are configured as transport ports. For a more detailed description of stacking packet switches together, see U.S. patent application Ser. Nos. 11/123,273; 11/123,377; 11/123,465; and 11/123,729, which were filed on May 5, 2005, and which are incorporated herein by reference in their entireties.

As depicted in FIG. 6, in one exemplary implementation, the action of a map rule in a port map assigned to a network port on one packet switch appliance can include forwarding a packet to one or more instrument ports on another packet switch appliance. In the example depicted in FIG. 6, assume the action of a map rule assigned to network port 104*a* on packet switch appliance 102*a* is to forward a packet to instrument ports 106*a*, 106*b*, and 106*c* on packet switch appliance 102*b*. Thus, in this example, a logical connection is established between network port 104*a* on packet switch appliance 102*a* and loop-back port 502 on packet switch appliance 102*b*. A VLAN is created having a membership that includes loop-back port 502 and instrument ports 106*a*, 106*b*, and 106*c*. A filter is assigned to network port 104*a* with a criterion, which matches the criterion of the map rule, and an action, which specifies that the VLAN tag of a packet patching the criterion of the filter be replaced with a VLAN tag that corresponds to the VLAN with loop-back port 502 and instrument ports 106*a*, 106*b*, and 106*c* as members. The action of the filter also specifies that the packet matching the criterion of the filter be forwarded to loop-back port 502 via transport ports 602*a* and 602*b*. Thus, when a packet is received through network port 104*a* on packet switch appliance 102*a* that matches the criterion of the filter, the packet is forwarded to loop-back port 502 on packet switch appliance 102*b* through transport ports 602*a* and 602*b*. The packet is then forwarded to instrument ports 106*a*, 106*b*, and 106*c* on packet switch appliance 102*b*.

In one exemplary implementation, in creating a port map for a network port, a user is prompted to specify whether an action of a map rule in the port map will forward a packet to a single port or multiple instrument ports. If the user specifies that the action will forward a packet to a single instrument port, then the action of the filter used to implement the map rule will be to forward the packet to the single instrument port as described above. If the user species that the action will forward a packet to multiple instrument ports, then the action of the filter used to implement the map rule will be to replace the VLAN tag of the packet with the VLAN tag of the VLAN having the multiple instrument ports as members and to forward the packet to a loop-back port as described above.

With reference again to FIG. 1, packet switch appliance 102 includes a network switch chip 114, a processor 116, memory 118, and a computer-readable storage medium 120. In the present exemplary embodiment, the various switching functions described above can be performed used network switch chip 114, processor 116, and memory 118. Any software, including the operating system, needed to operate packet switch appliance 102 can be stored as computer-executable instructions stored on computer-readable storage medium 120. For example, the computer-executable instructions to perform mapping process 200 (FIG. 2) can be stored on computer-readable storage medium 120. It should be recognized, however, that any one or more of these components can be omitted or any number of additional components can be added to packet switch appliance 102.

Although exemplary embodiments have been described, various modifications can be made without departing from the spirit and/or scope of the present invention. Therefore, the present invention should not be construed as being limited to the specific forms shown in the drawings and described above.

We claim:

1. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:
  a first map rule having a first criterion and a first action; and
  at least a second map rule having a second criterion and a second action;
  wherein the act of creating the first port map comprises creating an object that is selectively assignable to one or more of the plurality of ports;
assigning the first port map to the first network port; and
when an ingress packet is received from the packet-switching network through the first network port, applying the first port map to the ingress packet.

2. The method of claim 1, wherein the first port map includes:
a third rule having a third action, wherein the third action is performed if the first criterion, the second criterion, and any other criterion of any other map rule of the first port map are not met.

3. The method of claim 2, wherein the third action is to drop the ingress packet.

4. The method of claim 2, further comprising:
configuring a second port on the packet switch appliance to operate as a first instrument port connected to a network instrument, wherein the third action is to forward the ingress packet to the first instrument port.

5. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:
  a first map rule having a first criterion and a first action; and
  at least a second map rule having a second criterion and a second action;
assigning the first port map to the first network port; and
when an ingress packet is received from the packet-switching network through the first network port, applying the first port map to the ingress packet;
wherein the act of applying the first port map comprises:
processing the ingress packet based on the order of the first and second map rules in the first port map.

6. The method of claim 5, wherein the first map rule is ahead of the second map rule in order in the first port map, and wherein the act of processing the ingress packet comprises:
examining the ingress packet;
evaluating the first criterion based on the examination of the ingress packet;
if the first criterion is met, performing the first action;
if the first criterion is met, not evaluating the second criterion or any other criterion of any other map rule and not performing any other action of any other map rule except the first action of the first map rule;

if the first criterion is not met, evaluating the second criterion based on the examination of the ingress packet; and if the second criterion is met, performing the second action.

7. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:
a first map rule having a first criterion and a first action; and
at least a second map rule having a second criterion and a second action;

assigning the first port map to the first network port; and when an ingress packet is received from the packet-switching network through the first network port, applying the first port map to the ingress packet;

wherein the act of applying the first port map comprises:
examining the ingress packet;
evaluating the first criterion based on the examination of the ingress packet;
evaluating the second criterion based on the examination of the ingress packet; and
if the first and second criteria are met, applying a rule resolution procedure.

8. The method of claim 7, wherein the rule resolution procedure comprises:

if the first criterion is met before the second criterion and any other criterion of any other map rule of the first port map are met, performing only the first action;

if the second criterion is met after the first criterion and any other criterion of any other map rule of the first port map were met, performing only the second action; or performing the first action and the second action.

9. The method of claim 1, wherein the first action is to drop the ingress packet.

10. The method of claim 9, wherein the first action is to forward a packet to a virtual drop port, which is not a physical port.

11. The method of claim 1, further comprising:
configuring a second port on the packet switch appliance to operate as a first instrument port connected to a first network instrument.

12. The method of claim 11, wherein the first action is to forward the ingress packet to the first instrument port.

13. The method of claim 11, further comprising:
configuring a third port on the packet switch appliance to operate as a second instrument port connected to a second network instrument.

14. The method of claim 13, wherein the first action is to forward the ingress packet to the first instrument port and the second instrument port.

15. The method of claim 13, wherein the first action is to forward the ingress packet to the first instrument port, and wherein the second action is to forward the ingress packet to the second instrument port.

16. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:
a first map rule having a first criterion and a first action; and
at least a second map rule having a second criterion and a second action;

assigning the first port map to the first network port;

when an ingress packet is received from the packet-switching network through the first network port, applying the first port map to the ingress packet;

configuring a second port on the packet switch appliance to operate as a first instrument port connected to a first network instrument;

configuring a third port on the packet switch appliance to operate as a second instrument port connected to a second network instrument; and configuring a fourth port on the packet switch appliance to operate as a third instrument port connected to a third network instrument.

17. The method of claim 16, wherein the first action is to forward the ingress packet to the first and second instrument ports, and wherein the second action is to forward the ingress packet to the third instrument port.

18. The method of claim 16, wherein the first action is to forward the ingress packet to the first and second instrument ports, and wherein the second action is to forward the ingress packet to the second and third instrument ports.

19. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:
a first map rule having a first criterion and a first action; and
at least a second map rule having a second criterion and a second action;

assigning the first port map to the first network port;

when an ingress packet is received from the packet-switching network through the first network port, applying the first port map to the ingress packet;

configuring a second port on the packet switch appliance to operate as a second network port connected to the packet-switching network;

assigning the first port map to the second network port; and when an ingress packet is received from the packet-switching network through the second network port, applying the first port map to the ingress packet.

20. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:
a first map rule having a first criterion and a first action; and
at least a second map rule having a second criterion and a second action;

assigning the first port map to the first network port;

when an ingress packet is received from the packet-switching network through the first network port, applying the first port map to the ingress packet;

configuring a second port on the packet switch appliance to operate as a second network port connected to the packet-switching network;

assigning a second port map to the second network port, wherein the second port map comprises:

a third map rule having a third criterion and a third action;

at least a fourth map rule having a fourth criterion and a fourth action; and when an ingress packet is received from the packet-switching network through the second network port, applying the second port map to the ingress packet.

21. The method of claim 1, wherein the act of assigning the first port map to the first network port comprises:

assigning a first filter to the first network port, wherein the first filter includes a criterion, which corresponds to the first criterion of the first map rule, and an action, which corresponds to the first action of the first map rule.

22. The method of claim 21, wherein the act of assigning the first port map to the first network port comprises:

assigning a second filter to the first network port, wherein the second filter includes a criterion, which corresponds to the second criterion of the second map rule, and an action, which corresponds to the second action of the second map rule.

23. The method of claim 1, further comprising:

configuring one or more ports of the plurality of ports of the packet switch appliance to operate as a loop-back port, the loop-back port having an egress portion to send out a packet and an ingress portion to loop back the packet sent out the egress portion;

configuring a second port on the packet switch appliance to operate as a first instrument port connected to a first network instrument;

configuring a third port on the packet switch appliance to operate as a second instrument port connected to a second network instrument; and creating a first virtual local area network having the loop-back port, the first instrument port, and the second instrument port as members.

24. The method of claim 23, wherein the first action of the first map rule is to forward the ingress packet to the first and second instrument ports, wherein the act of assigning the first port map to the first network port comprises:

assigning a first filter to the first network port, wherein the first filter includes a criterion, which corresponds to the first criterion of the first map rule, and an action, wherein the action of the first filter includes:

placing a first virtual local area network tag on the ingress packet, the first virtual local area network tag corresponding to the first virtual local area network; and forwarding the ingress packet to the loop-back port.

25. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:

a first map rule having a first criterion and a first action; and at least a second map rule having a second criterion and a second action;

assigning the first port map to the first network port;

when an ingress packet is received from the packet-switching network through the first network port, applying the first port map to the ingress packet;

configuring one or more ports of the plurality of ports of the packet switch appliance to operate as a loop-back port, the loop-back port having an egress portion to send out a packet and an ingress portion to loop back the packet sent out the egress portion;

configuring a second port on the packet switch appliance to operate as a first instrument port connected to a first network instrument;

configuring a third port on the packet switch appliance to operate as a second instrument port connected to a second network instrument;

creating a first virtual local area network having the loop-back port, the first instrument port, and the second instrument port as members;

wherein the first action of the first map rule is to forward the ingress packet to the first and second instrument ports, wherein the act of assigning the first port map to the first network port comprises:

assigning a first filter to the first network port, wherein the first filter includes a criterion, which corresponds to the first criterion of the first map rule, and an action, wherein the action of the first filter includes:

placing a first virtual local area network tag on the ingress packet, the first virtual local area network tag corresponding to the first virtual local area network; and forwarding the ingress packet to the loop-back port;

wherein the method further comprises:

configuring a third port on the packet switch appliance to operate as a third instrument port connected to a third network instrument;

configuring a fourth port on the packet switch appliance to operate as a fourth instrument port connected to a fourth network instrument; and creating a second virtual local area network having the loop-back port, the third instrument port, and the fourth instrument port as members.

26. The method of claim 25, wherein the second action of the second map rule is to forward the ingress packet to the third and fourth instrument ports, wherein the act of assigning the first port map to the first network port comprises:

assigning a second filter to the first network port, wherein the second filter includes a criterion, which corresponds to the second criterion of the second map rule, and an action, wherein the action of the second filter includes:

placing a second virtual local area network tag on the ingress packet, the second virtual local area network tag corresponding to the second virtual local area network; and forwarding the ingress packet to the loop-back port.

27. A method of mapping a port of a packet switch appliance connected to a packet-switching network, wherein the packet switch appliance includes a plurality of ports, wherein one of the plurality of ports is configured to operate as a first network port connected to the packet-switching network, the method comprising:

creating a first port map having:

a first map rule having a first criterion and a first action; and at least a second map rule having a second criterion and a second action;

assigning the first port map to the first network port;

when an ingress packet is received from the packet-switching network through the first network port, applying the first port map to the ingress packet;

configuring another one of the plurality of ports on the packet switch appliance to operate as a first transport port;

configuring one of a plurality of ports on an additional packet switch appliance to operate as a second transport port;

configuring two ports of the plurality of ports of the additional packet switch appliance to operate as a loop-back port, wherein one of the two ports operates as an egress port to send out a packet, and wherein the other one of the two ports operates as an ingress to loop back the packet sent out the egress port;

establishing a logical connection between the network port on the packet switch appliance with the loop-back port on the additional packet switch appliance through the first and second transport ports;

configuring another one of the plurality of ports on the additional packet switch appliance to operate as a first instrument port connected to a first network instrument;

configuring another one of the plurality of ports on the additional packet switch appliance to operate as a second instrument port connected to a second network instrument; and creating a virtual local area network having the loop-back port, the first instrument port, and the second instrument port as members.

28. The method of claim 27, wherein the first action of the first map rule is to forward the ingress packet to the first and second instrument ports, wherein the act of assigning the first port map to the first network port comprises:

assigning a first filter to the first network port on the packet switch appliance, wherein the first filter includes a criterion, which corresponds to the first criterion of the first map rule, and an action, wherein the action of the first filter includes:

placing a virtual local area network tag on the ingress packet, the virtual local area network tag corresponding to the virtual local area network having the loop-back port, the first instrument port, and the second instrument port as members; and forwarding the ingress packet to the loop-back port on the additional packet switch appliance through the first and second transport ports.

29. A packet switch appliance configured to be connected to a packet-switching network, the packet switch appliance comprising:

a plurality of ports, wherein one of the plurality of ports is configured to operate as a first network port connected to the packet-switching network;

a computer-readable storage medium containing computer-executable instructions to operate the packet switch appliance, comprising instructions for:

creating a first port map having:

a first map rule having a first criterion and a first action; and at least a second map rule having a second criterion and a second action;

wherein the instruction for creating the first port map comprises instruction for creating an object that is selectively assignable to one or more of the plurality of ports; and assigning the first port map to the first network port, wherein the first port map is applied to an ingress packet when the ingress packet is received from the packet-switching network through the first network port.

30. The packet switch of claim 29, wherein the first port map includes:

a third rule having a third action, wherein the third action is performed if the first criterion, the second criterion, and any other criterion of any other map rule of the first port map are not met.

31. The packet switch of claim 30, wherein the third action is to drop the ingress packet.

32. The packet switch of claim 30, further comprising instructions for:

configuring a second port on the packet switch appliance to operate as a first instrument port connected to a network instrument, wherein the third action is to forward the ingress packet to the first instrument port.

33. A packet switch appliance configured to be connected to a packet-switching network, the packet switch appliance comprising:

a plurality of ports, wherein one of the plurality of ports is configured to operate as a first network port connected to the packet-switching network;

a computer-readable storage medium containing computer-executable instructions to operate the packet switch appliance, comprising instructions for:

creating a first port map having:

a first map rule having a first criterion and a first action; and at least a second map rule having a second criterion and a second action; and assigning the first port map to the first network port, wherein the first port map is applied to an ingress packet when the ingress packet is received from the packet-switching network through the first network port;

wherein the first map rule is ahead of the second map rule in order in the first port map, and the storage medium further comprises instructions for:

examining the ingress packet;

evaluating the first criterion based on the examination of the ingress packet;

if the first criterion is met, performing the first action;

if the first criterion is met, not evaluating the second criterion or any other criterion of any other map rule and not performing any other action of any other map rule except the first action of the first map rule;

if the first criterion is not met, evaluating the second criterion based on the examination of the ingress packet; and if the second criterion is met, performing the second action.

34. A packet switch appliance configured to be connected to a packet-switching network, the packet switch appliance comprising:

a plurality of ports, wherein one of the plurality of ports is configured to operate as a first network port connected to the packet-switching network;

a computer-readable storage medium containing computer-executable instructions to operate the packet switch appliance, comprising instructions for:

creating a first port map having:

a first map rule having a first criterion and a first action; and at least a second map rule having a second criterion and a second action;

assigning the first port map to the first network port, wherein the first port map is applied to an ingress packet when the ingress packet is received from the packet-switching network through the first network port;

examining the ingress packet;

evaluating the first criterion based on the examination of the ingress packet;

evaluating the second criterion based on the examination of the ingress packet; and if the first and second criteria are met, applying a rule resolution procedure.

35. The packet switch of claim 29, further comprising instructions for:

configuring a second port on the packet switch appliance to operate as a first instrument port connected to a first network instrument; and configuring a third port on the packet switch appliance to operate as a second instrument port connected to a second network instrument.

36. The packet switch of claim 35, wherein the first action is to forward the ingress packet to the first instrument port and the second instrument port.

37. The packet switch of claim 35, wherein the first action is to forward the ingress packet to the first instrument port, and wherein the second action is to forward the ingress packet to the second instrument port.

38. A packet switch appliance configured to be connected to a packet-switching network, the packet switch appliance comprising:

a plurality of ports, wherein one of the plurality of ports is configured to operate as a first network port connected to the packet-switching network;

a computer-readable storage medium containing computer-executable instructions to operate the packet switch appliance, comprising instructions for:

creating a first port map having:

a first map rule having a first criterion and a first action; and at least a second map rule having a second criterion and a second action;

assigning the first port map to the first network port, wherein the first port map is applied to an ingress packet when the ingress packet is received from the packet-switching network through the first network port;

configuring a second port on the packet switch appliance to operate as a first instrument port connected to a first network instrument;

configuring a third port on the packet switch appliance to operate as a second instrument port connected to a second network instrument; and configuring a fourth port on the packet switch appliance to operate as a third instrument port connected to a third network instrument.

39. The packet switch of claim 38, wherein the first action is to forward the ingress packet to the first and second instrument ports, and wherein the second action is to forward the ingress packet to the third instrument port.

40. The packet switch of claim 38, wherein the first action is to forward the ingress packet to the first and second instrument ports, and wherein the second action is to forward the ingress packet to the second and third instrument ports.

41. A packet switch appliance configured to be connected to a packet-switching network, the packet switch appliance comprising:

a plurality of ports, wherein one of the plurality of ports is configured to operate as a first network port connected to the packet-switching network;

a computer-readable storage medium containing computer-executable instructions to operate the packet switch appliance, comprising instructions for:

creating a first port map having:

a first map rule having a first criterion and a first action; and at least a second map rule having a second criterion and a second action;

assigning the first port map to the first network port, wherein the first port map is applied to an ingress packet when the ingress packet is received from the packet-switching network through the first network port;

configuring a second port on the packet switch appliance to operate as a second network port connected to the packet-switching network;

assigning the first port map to the second network port, wherein the first port map is applied to an ingress packet when the ingress packet is received from the packet-switching network through the second network port.

42. The packet switch of claim 29, wherein a second port on the packet switch appliance is configured to operate as a second network port connected to the packet-switching network, and wherein the packet switch further comprises instructions for:

assigning a second port map to the second network port, wherein the second port map comprises:

a third map rule having a third criterion and a third action; and at least a fourth map rule having a fourth criterion and a fourth action, wherein the second port map is applied to an ingress packet when the ingress packet is received from the packet-switching network through the second network port.

43. The packet switch of claim 29, wherein the instruction for assigning the first port map to the first network port comprises instructions for:

assigning a first filter to the first network port, wherein the first filter includes a criterion, which corresponds to the first criterion of the first map rule, and an action, which corresponds to the first action of the first map rule; and assigning a second filter to the first network port, wherein the second filter includes a criterion, which corresponds to the second criterion of the second map rule, and an action, which corresponds to the second action of the second map rule.

44. The packet switch of claim 29, further comprising instructions for:

configuring one or more ports of the plurality of ports of the packet switch appliance to operate as a loop-back port, the loop-back port having an egress portion to send out a packet and an ingress portion to loop back the packet sent out the egress portion;

configuring a second port on the packet switch appliance to operate as a first instrument port connected to a first network instrument;

configuring a third port on the packet switch appliance to operate as a second instrument port connected to a second network instrument; and creating a first virtual local area network having the loop-back port, the first instrument port, and the second instrument port as members.

45. The packet switch of claim 44, wherein the first action of the first map rule is to forward the ingress packet to the first and second instrument ports, wherein the instruction for assigning the first port map to the first network port comprises instructions for:

assigning a first filter to the first network port, wherein the first filter includes a criterion, which corresponds to the first criterion of the first map rule, and an action, wherein the action of the first filter includes:
  placing a first virtual local area network tag on the ingress packet, the first virtual local area network tag corresponding to the first virtual local area network; and
  forwarding the ingress packet to the loop-back port.

46. The packet switch of claim 45, A packet switch appliance configured to be connected to a packet-switching network, the packet switch appliance comprising:
  a plurality of ports, wherein one of the plurality of ports is configured to operate as a first network port connected to the packet-switching network;
  a computer-readable storage medium containing computer-executable instructions to operate the packet switch appliance, comprising instructions for:
    creating a first port map having:
      a first map rule having a first criterion and a first action; and
      at least a second map rule having a second criterion and a second action;
    assigning the first port map to the first network port, wherein the first port map is applied to an ingress packet when the ingress packet is received from the packet-switching network through the first network port;
    configuring one or more ports of the plurality of ports of the packet switch appliance to operate as a loop-back port, the loop-back port having an egress portion to send out a packet and an ingress portion to loop back the packet sent out the egress portion;
    configuring a second port on the packet switch appliance to operate as a first instrument port connected to a first network instrument;
    configuring a third port on the packet switch appliance to operate as a second instrument port connected to a second network instrument; and
    creating a first virtual local area network having the loop-back port, the first instrument port, and the second instrument port as members;
  wherein the first action of the first map rule is to forward the ingress packet to the first and second instrument ports, wherein instruction for assigning the first port map to the first network port comprises instructions for assigning a first filter to the first network port;
  wherein the first filter includes a criterion, which corresponds to the first criterion of the first map rule, and an action, wherein the action of the first filter includes:
    placing a first virtual local area network tag on the ingress packet, the first virtual local area network tag corresponding to the first virtual local area network; and
    forwarding the ingress packet to the loop-back port;
  wherein the storage medium further comprises instruction for:
    configuring a third port on the packet switch appliance to operate as a third instrument port connected to a third network instrument;
    configuring a fourth port on the packet switch appliance to operate as a fourth instrument port connected to a fourth network instrument; and
    creating a second virtual local area network having the loop-back port, the third instrument port, and the fourth instrument port as members.

47. The packet switch of claim 46, wherein the second action of the second map rule is to forward the ingress packet to the third and fourth instrument ports, wherein the instruction for assigning the first port map to the first network port comprises instructions for:
  assigning a second filter to the first network port, wherein the second filter includes a criterion, which corresponds to the second criterion of the second map rule, and an action, wherein the action of the second filter includes:
    placing a second virtual local area network tag on the ingress packet, the second virtual local area network tag corresponding to the second virtual local area network; and
    forwarding the ingress packet to the loop-back port.

48. A packet switch appliance configured to be connected to a packet-switching network, the packet switch appliance comprising:
  a plurality of ports, wherein one of the plurality of ports is configured to operate as a first network port connected to the packet-switching network;
  a computer-readable storage medium containing computer-executable instructions to operate the packet switch appliance, comprising instructions for:
    creating a first port map having:
      a first map rule having a first criterion and a first action; and
      at least a second map rule having a second criterion and a second action; and
    assigning the first port map to the first network port, wherein the first port map is applied to an ingress packet when the ingress packet is received from the packet-switching network through the first network port; and
  instructions for:
    configuring another one of the plurality of ports on the packet switch appliance to operate as a first transport port;
    configuring one of a plurality of ports on an additional packet switch appliance to operate as a second transport port;
    configuring two ports of the plurality of ports of the additional packet switch appliance to operate as a loop-back port, wherein one of the two ports operates as an egress port to send out a packet, and wherein one of the two ports operates as an ingress to loop back the packet sent out the egress port;
    establishing a logical connection between the network port on the packet switch appliance with the loop-back port on the additional packet switch appliance through the first and second transport ports;
    configuring another one of the plurality of ports on the additional packet switch appliance to operate as a first instrument port connected to a first network instrument;
    configuring another one of the plurality of ports on the additional packet switch appliance to operate as a second instrument port connected to a second network instrument; and
    creating a virtual local area network having the loop-back port, the first instrument port, and the second instrument port as members.

49. The packet switch of claim 48, wherein the first action of the first map rule is to forward the ingress packet to the first and second instrument ports, wherein the instruction for assigning the first port map to the first network port comprises instructions for:
  assigning a first filter to the first network port on the packet switch appliance, wherein the first filter includes a criterion, which corresponds to the first criterion of the first map rule, and an action, wherein the action of the first filter includes:
   placing a virtual local area network tag on the ingress packet, the virtual local area network tag corresponding to the virtual local area network having the loop-back port, the first instrument port, and the second instrument port as members; and
   forwarding the ingress packet to the loop-back port on the additional packet switch appliance through the first and second transport ports.

50. A non-transitory computer-readable storage medium containing computer-executable instructions to operate a packet switch appliance configured to be connected to a packet-switching network, wherein the packet switch appliance includes a plurality of ports, wherein one of the plurality of ports is configured to operate as a first network port connected to the packet-switching network, the storage medium comprising instructions for:
   creating a first port map having:
      a first map rule having a first criterion and a first action; and
      at least a second map rule having a second criterion and a second action;
      wherein the instruction for creating the first port map comprises instruction for creating an object that is selectively assignable to one or more of the plurality of ports; and
   assigning the first port map to the first network port, wherein the first port map is applied to an ingress packet when the ingress packet is received from the packet-switching network through the first network port.

51. The non-transitory computer-readable storage medium of claim 50, wherein the first port map includes:
   a third rule having a third action, wherein the third action is performed if the first criterion, the second criterion, and any other criterion of any other map rule of the first port map are not met.

52. A non-transitory computer-readable storage medium containing computer-executable instructions to operate a packet switch appliance configured to be connected to a packet-switching network, wherein the packet switch appliance includes a plurality of ports, wherein one of the plurality of ports is configured to operate as a first network port connected to the packet-switching network, the storage medium comprising instructions for:
   creating a first port map having:
      a first map rule having a first criterion and a first action; and
      at least a second map rule having a second criterion and a second action; and
   assigning the first port map to the first network port, wherein the first port map is applied to an ingress packet when the ingress packet is received from the packet-switching network through the first network port;
   wherein the first map rule is ahead of the second map rule in order in the first port map, and the storage medium further comprises instructions for:
      examining the ingress packet;
      evaluating the first criterion based on the examination of the ingress packet;
      if the first criterion is met, performing the first action;
      if the first criterion is met, not evaluating the second criterion or any other criterion of any other map rule and not performing any other action of any other map rule except the first action of the first map rule;
      if the first criterion is not met, evaluating the second criterion based on the examination of the ingress packet; and
      if the second criterion is met, performing the second action.

53. The non-transitory computer-readable storage medium of claim 50, further comprises instructions for:
   examining the ingress packet;
   evaluating the first criterion based on the examination of the ingress packet;
   evaluating the second criterion based on the examination of the ingress packet; and
   if the first and second criteria are met, applying a rule resolution procedure.

54. The non-transitory computer-readable storage medium of claim 50, wherein the instruction for assigning the first port map to the first network port comprises instructions for:
   assigning a first filter to the first network port, wherein the first filter includes a criterion, which corresponds to the first criterion of the first map rule, and an action, which corresponds to the first action of the first map rule; and
   assigning a second filter to the first network port, wherein the second filter includes a criterion, which corresponds to the second criterion of the second map rule, and an action, which corresponds to the second action of the second map rule.

55. The non-transitory computer-readable storage medium of claim 50, further comprising instructions for:
   configuring one or more ports of the plurality of ports of the packet switch appliance to operate as a loop-back port, the loop-back port having an egress portion to send out a packet and an ingress portion to loop back the packet sent out the egress portion;
   configuring a second port on the packet switch appliance to operate as a first instrument port connected to a first network instrument;
   configuring a third port on the packet switch appliance to operate as a second instrument port connected to a second network instrument; and
   creating a first virtual local area network having the loop-back port, the first instrument port, and the second instrument port as members.

56. The non-transitory computer-readable storage medium of claim 55, wherein the first action of the first map rule is to forward the ingress packet to the first and second instrument ports, wherein the instruction for assigning the first port map to the first network port comprises instructions for:
   assigning a first filter to the first network port, wherein the first filter includes a criterion, which corresponds to the first criterion of the first map rule, and an action, wherein the action of the first filter includes:
      placing a first virtual local area network tag on the ingress packet, the first virtual local area network tag corresponding to the first virtual local area network; and
      forwarding the ingress packet to the loop-back port; and
   configuring a third port on the packet switch appliance to operate as a third instrument port connected to a third network instrument.

57. A non-transitory computer-readable storage medium containing computer-executable instructions to operate a packet switch appliance configured to be connected to a packet-switching network, wherein the packet switch appliance includes a plurality of ports, wherein one of the plurality of ports is configured to operate as a first network port connected to the packet-switching network, the storage medium comprising instructions for:

creating a first port map having:
- a first map rule having a first criterion and a first action; and
- at least a second map rule having a second criterion and a second action;

assigning the first port map to the first network port, wherein the first port map is applied to an ingress packet when the ingress packet is received from the packet-switching network through the first network port;

configuring another one of the plurality of ports on the packet switch appliance to operate as a first transport port;

configuring one of a plurality of ports on an additional packet switch appliance to operate as a second transport port; and configuring two ports of the plurality of ports of the additional packet switch appliance to operate as a loop-back port, wherein one of the two ports operates as an egress port to send out a packet, and wherein one of the two ports operates as an ingress to loop back the packet sent out the egress port;

establishing a logical connection between the network port on the packet switch appliance with the loop-back port on the additional packet switch appliance through the first and second transport ports;

configuring another one of the plurality of ports on the additional packet switch appliance to operate as a first instrument port connected to a first network instrument;

configuring another one of the plurality of ports on the additional packet switch appliance to operate as a second instrument port connected to a second network instrument; and creating a virtual local area network having the loop-back port, the first instrument port, and the second instrument port as members.

58. The non-transitory computer-readable storage medium of claim 57, wherein the first action of the first map rule is to forward the ingress packet to the first and second instrument ports, wherein the instruction for assigning the first port map to the first network port comprises instructions for:

assigning a first filter to the first network port on the packet switch appliance, wherein the first filter includes a criterion, which corresponds to the first criterion of the first map rule, and an action, wherein the action of the first filter includes:
- placing a virtual local area network tag on the ingress packet, the virtual local area network tag corresponding to the virtual local area network having the loop-back port, the first instrument port, and the second instrument port as members; and
- forwarding the ingress packet to the loop-back port on the additional packet switch appliance through the first and second transport ports.

59. The method of claim 1, wherein the first map rule comprises a garbage collection rule.

60. The method of claim 1, wherein the object is created using a scripted command.

61. The packet switch appliance of claim 29, wherein the first map rule comprises a garbage collection rule.

62. The packet switch appliance of claim 29, wherein the object is created using a scripted command.

63. The non-transitory computer-readable storage medium of claim 50, wherein the first map rule comprises a garbage collection rule.

64. The non-transitory computer-readable storage medium of claim 50, wherein the object is created using a scripted command.

* * * * *